United States Patent

Pray

[11] 4,212,094
[45] Jul. 15, 1980

[54] BELT FASTENERS

[75] Inventor: Winston C. Pray, Lombard, Ill.

[73] Assignee: Flexible Steel Lacing Company, Downers Grove, Ill.

[21] Appl. No.: 948,970

[22] Filed: Oct. 5, 1978

[51] Int. Cl.² .............................................. F16G 3/02
[52] U.S. Cl. .................................... 24/31 B; 24/33 B; 24/33 P; 403/2; 474/257
[58] Field of Search .................... 24/33 B, 33 P, 31 B, 24/33 R, 33 A; 16/171, 128, DIG. 13; 74/231 J; 403/2, 12

[56] References Cited

U.S. PATENT DOCUMENTS

| 322,986 | 7/1885 | Smith | 24/33 B |
|---|---|---|---|
| 1,249,419 | 12/1917 | Kinsler | 24/33 B |
| 1,676,083 | 7/1928 | Faure | 24/33 B |
| 3,176,358 | 4/1965 | Leflon | 24/33 B |
| 3,793,612 | 2/1974 | Driscoll | 16/DIG. 13 |
| 3,846,030 | 11/1974 | Katt | 403/2 |
| 3,913,180 | 10/1975 | Pray | 24/33 B |
| 3,962,754 | 6/1976 | Stolz | 24/33 B |
| 4,024,605 | 5/1977 | Henke | 24/33 P |

FOREIGN PATENT DOCUMENTS

| 2249576 | 10/1973 | France | 24/33 R |
| 1077926 | 8/1967 | United Kingdom | 24/33 B |

*Primary Examiner*—Victor N. Sakran
*Attorney, Agent, or Firm*—Fitch, Even & Tabin

[57] ABSTRACT

A plurality of belt fasteners are joined together by intermediate bridging portions which may break off and leave the adjacent belt fastener edges spaced from each other by the width of the bridging portions when the belt is in use. The preferred fasteners are plate fasteners joined together in a strip of these frangible bridge portions. Preferably, a pair of lines of weakness are formed by stamping parallel notches adjacent either edge of the plate fastener so that substantially all of the bridging material between adjacent fasteners may break off thereby leaving a sizeable gap between adjacent sides of adjacent fasteners.

5 Claims, 7 Drawing Figures

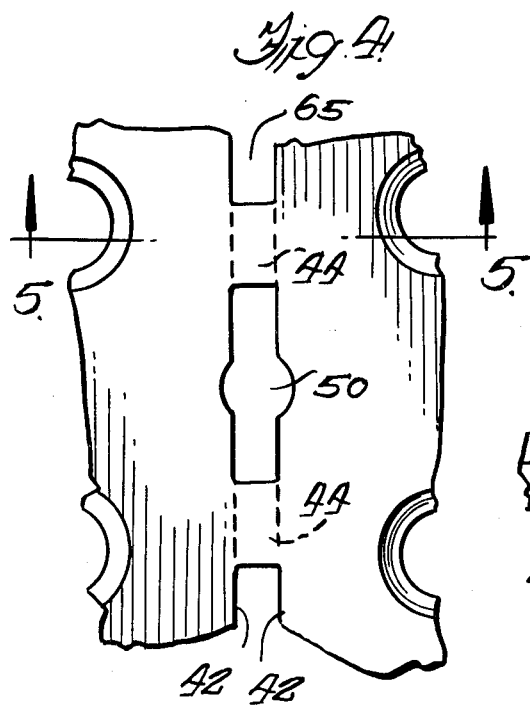
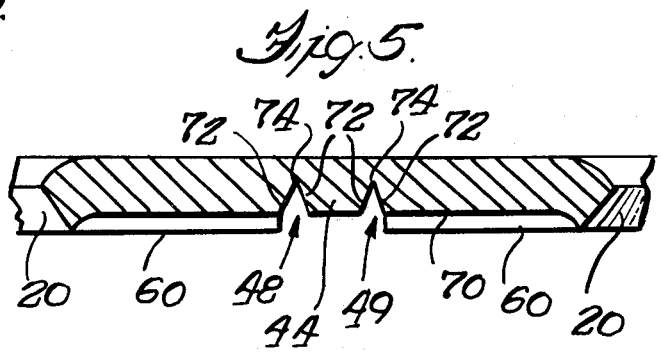
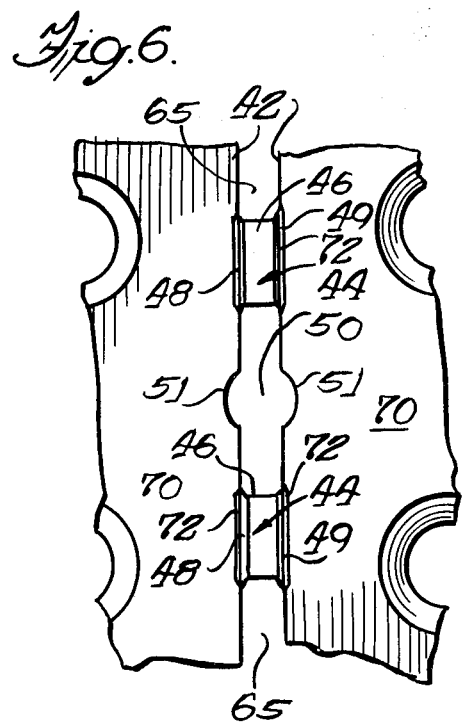
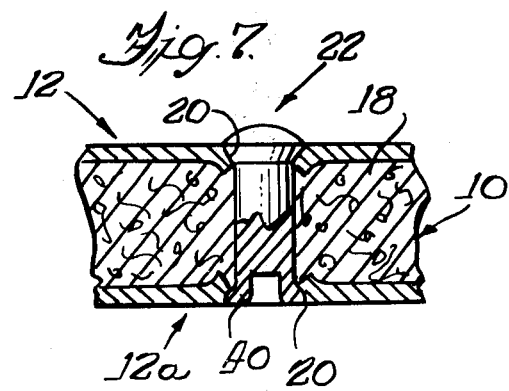

BELT FASTENERS

This invention relates to belt fasteners and more particularly to belt fasteners used for joining ends of conveyor belts together.

Various kinds of belt fasteners are used to join ends of an endless conveyor belt together. Usually, several adjacent belt fasteners are formed from a single piece of steel and the resulting belt fasteners are joined to each other in a strip. Notched portions are formed in the steel stock between adjacent fasteners to allow the adjacent belt fasteners to break and to separate one from another at these notches, particularly at those notches located at the belt areas where the belt is bent upwardly to form a trough for conveying material. The belt fasteners may be of the so-called hinge type which have a loop shaped portion for receiving the hinge pin inserted through interleaved loops of belt fasteners fastened to the respective ends of the belt being joined together. The hinge belt fasteners have plates which lie both on top and bottom of the conveyor belt and these plates are secured to the top and bottom sides of the belt by rivets, staples, or bolts. Another common type of belt fastener is the plate fastener which is used without a hinge pin. A series of upper plates are fastened across an interface formed by abutted belt ends and the upper plate fasteners are aligned with a set of underlying lower plate belt fasteners. Then, rivets or other devices are driven through the belts and apertures in the respective upper and lower plate fasteners to join them to each of the belt ends.

The joining of adjacent belt fasteners facilitates an alignment of the belt fasteners in a straight line along the belt end and assists in maintaining this alignment during the driving of the rivets and the flaring and seating of the lower rivet ends to form lower heads on the rivets. The preferred apparatus used for joining upper and lower plate belt fasteners to a conveyor belt is disclosed in co-pending application, filed of even date and entitled METHOD AND APPARATUS FOR FASTENING BELT FASTENERS, which is hereby incorporated by reference as if fully reproduced herein.

In some instances, conveyor belts are not only flexed to provide an upward opening trough during the conveying of material but also are flexed in the opposite direction to form downwardly opening trough during the return run of the conveyor belt. This alternate flexing of the belt assists in dislodging the material which may have a tendency to stick to the belt. When the conveyor belt bends into a trough, the upper side goes into compression and the bottom side goes into expansion. The belt fasteners on the upper side of the belt at the compressed belt areas are brought closer together. Indeed, it has been observed, in some instances, that adjacent plates of the belt fasteners actually ride up or slide over one another due to the compression of the belt, particularly at the locations of extreme bending as where the belt is being troughed. This sliding of the belt fasteners over each other and this working against one another has a tendency to pry loose the belt fasteners from the belt which is an undesirable condition.

Accordingly, a general object of the present invention is to provide a new and improved belt fastener system for fastening belt fasteners to the conveyor belt ends.

Another object of the invention is to provide a new and improved strip of belt fasteners to alleviate some of the problems caused by plates riding up over one another.

Other objects and advantages of the present invention will become apparent from the detailed description taken in connection with the accompanying drawings in which:

FIG. 4 is a fragmentary, enlarged top plan view of the bridging means.

FIG. 5 is a cross-sectional view taken substantially along the line 5—5 of FIG. 4.

FIG. 6 is a bottom view of the bridging means shown in FIG. 4.

FIG. 7 is a fragmentary cross-sectional view of plate fasteners riveted to a belt.

Figure 1:
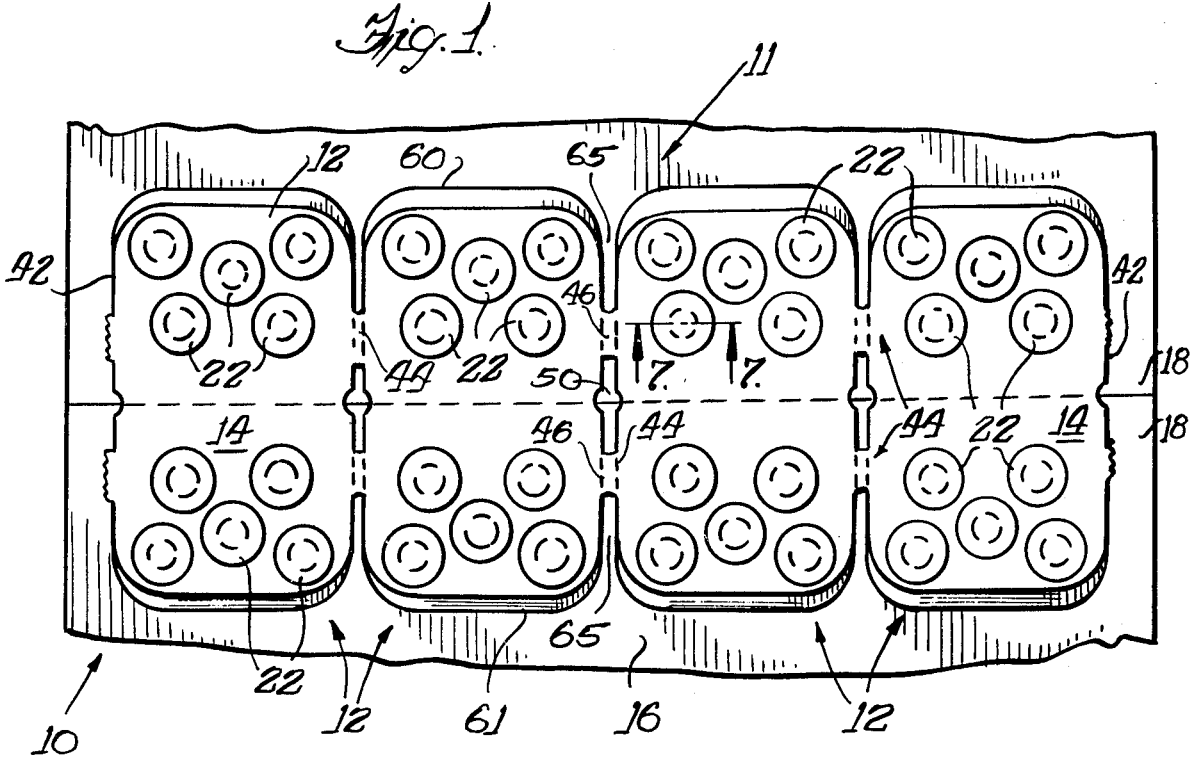
FIG. 1 is a top plan view of a strip of belt fasteners constructed in accordance with a preferred embodiment of the invention for securing to conveyor belt ends.

As shown in the drawings for purposes of illustration, the invention is embodied in a conveyor belt 10 and a strip 11 of belt fasteners 12 each of which has a plate-like body 14 for laying on a side 16 of a conveyor belt end 18. Apertures 20 in the plate body 14 allow the securing of the plate bodies to the belt ends 18 by a securing means such as rivets 22 (FIG. 7) which are shown securing an upper belt fastener 12 to the top side of the belt and a lower belt fastener 12a to the underside of the belt.

Figure 2:
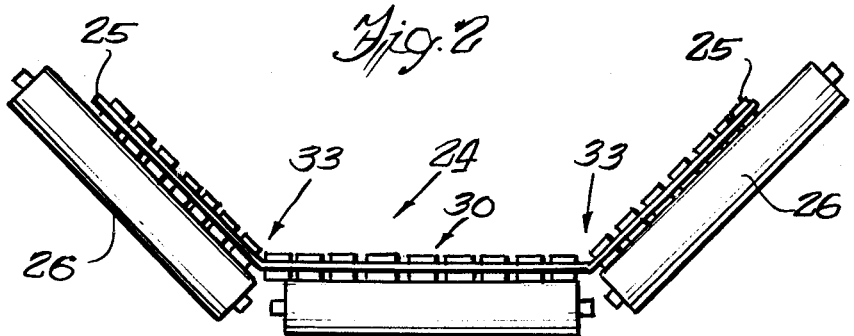
FIG. 2 is a diagrammatic illustration of a conveyor belt being formed into a trough.

The belt fasteners are usually formed in strips of anywhere from two to 20 or more belt fasteners and are formed from a single sheet of metal stock, usually steel, with integral connections between the adjacent fasteners 12 having a notch therebetween which allows the belt fasteners to separate particularly when they are bent and flexed to form a trough 24, such as illustrated in FIG. 2, in which the outer sides 25 of the belt 10 are bent upwardly and inclined to the horizontal by supporting rollers 26. A central portion 30 of the belt is generally horizontally disposed and is supported by an underlying roller 32. It will be appreciated that the relatively heavy and thick belt fastener bodies 14 must be separated from their adjacent belt fasteners particularly at the bent areas 33 (FIG. 2) to allow formation of the troughing action, the bent areas being at the intersection of the upwardly inclined belt portions 25 relative to central horizontal belt portions 30, as shown in FIG. 2.

It has been observed that the belt fasteners, particularly of the plate type shown herein, have a tendency to abut and ride up over one another, particularly at the area where the upper side of the belt is being compressed at the bent areas 33, i.e., the intersection of the inclined and horizontal belt troughing portions. Indeed, in some instances, it appears that there may be as much as ⅛" overlap of one belt fastener plate over its adjacent belt fastener at the intersections 33. Manifestly, any belt fastener being pushed upwardly and outwardly relative to the underlying belt body is attempting to tear loose the rivet 22, (FIG. 7), from the belt 10.

In accordance with the present invention, the problem of belt fasteners 12 riding up over each other is alleviated by providing a frangible or breakaway bridge means 44 between adjacent belt fastener plates so that a space is developed during belt usage as the belts trough and break away portions 46 (FIG. 3) thereby leaving a space 47 between adjacent plate bodies 14 where the bridging means 44 was formerly located. The width of the space 47 between adjacent fastener edges 42 is sufficient so that edges 42 do not ride up one over the other. Preferably, the breaking away of the bridging means is assured by forming a pair of spaced, parallel lines of weakness in the form of grooves 48 and 49 in the metal stock to provide reduced cross-sectional metal thickness resulting in areas of weakness. The grooves 48 and 49 define therebetween the central bridge portions 44 which become broken away when being flexed by the belt such as during the troughing operation. Herein, the bridging means 44 comprises a pair of spaced break-away portions 46 which are spaced from each other by a central slot 50 cut into the metal stock at the central area between adjacent belt fasteners. As disclosed in the aforesaid co-pending application, retaining clips are inserted through this central slot 50 for locating and for clamping the belt fasteners within a device during the hammering of rivets into and through the apertures 20 of the upper and lower belt fasteners.

Preferably, the width of the breakaway bridge portion 46 is sufficient to keep the adjacent facing plate edges 42 from abutting and riding over one another. By way of example only, the illustrated bridging portions should have a width of about 0.114" thereby providing almost a ⅛" clearance between adjacent belt fastener sides 42.

Figure 3:
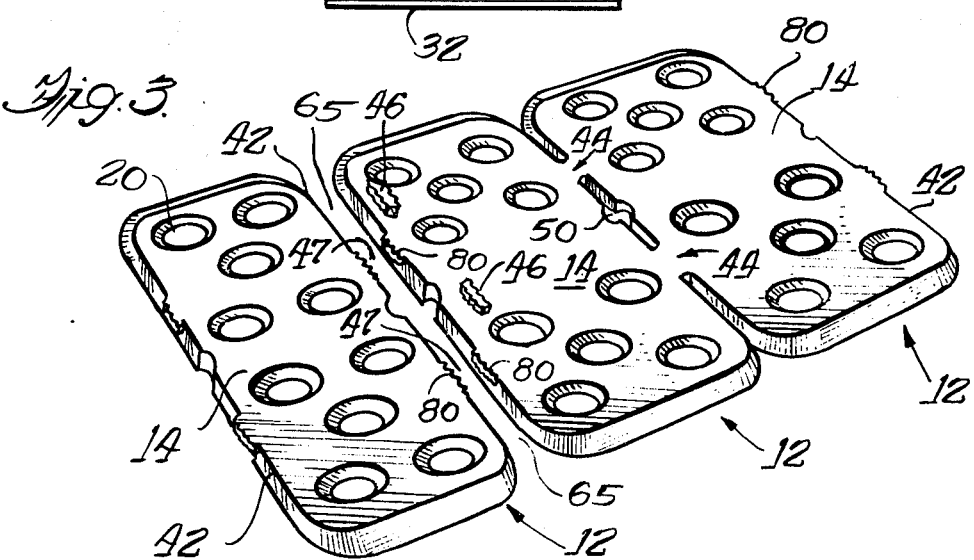
FIG. 3 is a diagrammatic perspective view showing breakaway bridging portions between adjacent fasteners.

Referring now in greater detail to a specific embodiment of the invention, there is disclosed a strip of belt fasteners 11 which are formed from steel strip stock having a thickness of 0.093" and having a length of about 2.688" between opposite edges 60 and 61 and a width between their side edges 42 of about 1.5625". The width of the outer channels or slots 65 between adjacent facing surfaces 42 is about 0.125" and the length of the respective channels 65 from the respective edges 60 or 61 is about 0.668". The grooves 48 and 49 are separated at the centers of their respective V-shaped grooves by a distance of 0.114" thereby leaving a gap 47 of approximately 0.114" when the portions 46 have broken away as is illustrated in FIG. 3. The length of the central slot 50 is, in this instance, about 0.666", the respective lengths of the bridge members being about 0.324".

The illustrated belt fasteners 12 each have ten apertures 20 for receiving a rivet with the diameter of the apertures being about 0.200" in diameter with a countersink of about 0.206 in diameter.

In another embodiment of the invention (not shown) the material is slightly thicker having a thickness of 0.125" and the fasteners are slightly longer in length having a length of 3.750". The breakaway bridge portions in this other embodiment of the invention are preferably about the same, namely, 0.114" in width and have about the same length.

It is preferred to form the grooves 48 and 49 only on the bottom side 70 of the strip of fasteners, as best seen in FIGS. 5 and 6, with the preferred grooves having a V-shaped cross section. The preferred grooves have an included angle of 60° between side walls 72 and the depth of the respective grooves to the pointed ends 74 thereof is about one-half of the metal plate thickness, i.e., about 0.047" for the illustrated embodiment and about 0.063" for the embodiment not illustrated herein.

After the belt fasteners 12 have been fastened to the belt by the rivets 22, ten rivets will be clamping each belt fastener tightly against one face of a belt end. This clamping force is such that the forces experienced during belt troughing causes a fracturing of the frangible portions 46 which will then drop away, as best seen in FIG. 3, leaving the adjacent fastener sides 42 spaced from each other by a considerable distance, this being approximately ⅛", in this instance. Thus it will be seen that the belt fasteners 12 may be spaced sufficiently from the adjacent side of an adjacent belt fastener and a breaking away of these frangible bridging means to prevent the riding up of one plate over another plate, as heretofore described.

The V-shaped grooves 48 and 49 are preferably stamped in the metallic strip during or subsequent to the other stamping operations forming the strip of fasteners to provide an inexpensive manner of forming the lines of weakness. The lines of weakness constitute a frangible means joining the bridging means 44 to the plate fastener bodies 14. Other frangible means may also be used. For example, the metal defining the bridge means 44 was pushed down and then up relative to the edges 42 of the plate bodies to weaken the junctures of the bridging means 44 with the adjacent fastener plates. Manifestly, the frangible means may include other lines of weakness such as having notches in both the upper and bottom sides of the metal stock.

Likewise, the illustrated bridging means 44 may be only a single piece of metal joining the adjacent plate bodies 14 rather than the pair of bridging portions separated by the space 50. The outer channel spaces also aid in reducing the width of the breakaway bridge portions. The preferred width for the bridge portions is substantially equal to that of the width between adjacent plate body edges 42 so that when the bridging portions have broken away the jagged remaining edges are substantially in line with the plate body edges 42 to give a maximum width to the space 47 between plate bodies. Manifestly, this width may be varied and the location of frangible means may be shifted from that illustrated wherein the V-shaped notches or grooves 48 and 49 are in alignment with the longitudinally extending edges 42 of the plate bodies.

In some instances, the metal bridging portions 46 may be undesirable to the conveyor operator who may want to remove these portions before they drop in the conveyed product or into his conveyor drive apparatus. The bridging portions may be manually removed after the belt fasteners 12 have been secured to the belt by hitting the tops thereof with a chisel blow. This breaks off the bridge portions 46 at the grooves 48 and 49. The bridge portions are still held by a wedging action between the adjacent fasteners. By hitting these broken away bridge portions with a sideways blow with a chisel, they may be removed from between the plate fasteners and collected. The formation of the grooves 48 and 49 on the underside 70 of the fasteners assists in the outward movement of the broken off bridging portions 46 from between the plates. Also, the break edge 80 remaining on the plates is pointed down and is not a sharp upwardly pointed edge when the grooves 48 and 49 are formed in the undersides of the plate fasteners.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A plurality of metallic belt fasteners joined together in a strip for joining belt ends together, comprising: a first belt fastener having at least one plate body for laying against one side of the belt, a plurality of openings in said plate body for receiving fastener means to penetrate the belt and to secure the plate body at a definite fixed location on the belt end, a second adjacent belt fastener having a plate body for laying against the same side of the belt, a plurality of openings in said second plate body for receiving fastener means to secure the second plate body to the belt at a fixed location closely adjacent the first plate body, a metallic bridge means joining said first and second plate bodies and being integrally attached to each of them, said bridge means joining said fastener plates and holding said plates in a predetermined relationship to each other with said openings in said adjacent plates being located at fixed and predetermined locations to each other and to an end of the belt, frangible means connecting said bridge means to said first and second fastener plates for breaking away said bridge means, said bridge means spacing said fastener plates from each other until being broken away and leaving a substantial space between adjacent edges of said fastener plates, said frangible means being adapted to allow chiseling of said bridge means after securing said fastener plates or said bridge means breaking away along one side at said first plate body with the flexing of the belt and then along the other side at said second plate body under flexing of the belt.

2. Belt fasteners in accordance with claim 1 in which said frangible means comprises a pair of spaced parallel lines of weakness formed in the metal between adjacent fasteners and defining the width of the bridge means to be broken away.

3. Belt fasteners in accordance with claim 2 in which said lines of weakness are continuous V-shaped grooves defining reduced cross-sectional thickness areas.

4. Belt fasteners in accordance with claim 1 in which said bridge means comprises first and second bridge portions separated by a centrally located slot therebetween, each of said bridge portions being adapted to break away to leave said first and second plate bodies spaced from each other.

5. A plurality of belt fasteners in accordance with claim 1 in which said frangible means comprises a first groove means formed in the underside of said bridge means to define a first line of weakness for fracturing and a second groove means formed in the underside of said bridge means and paralleling said first groove means to define a second line of weakness for fracturing, said groove means assisting in the outward movement of said bridge means when it is broken off from said plate bodies.

* * * * *